(12) United States Patent
Eisman

(10) Patent No.: US 6,465,535 B1
(45) Date of Patent: Oct. 15, 2002

(54) GRIP MATERIAL

(75) Inventor: Daniel M. Eisman, Rockford, IL (US)

(73) Assignee: Estwing Manufacturing Company, Rockford, IL (US)

(*) Notice: Subject to any disclaimer, the term of this patent is extended or adjusted under 35 U.S.C. 154(b) by 0 days.

(21) Appl. No.: 09/515,452

(22) Filed: Feb. 29, 2000

(51) Int. Cl.[7] ............................................. C08F 114/00
(52) U.S. Cl. ............................ 521/145; 16/421; 81/22; 81/177.1; 81/489; 428/304.4; 428/314.4; 428/411.1; 428/500; 521/73; 521/75; 521/142
(58) Field of Search .................. 521/142, 145, 521/73, 75; 81/22, 177.1, 489; 16/421; 428/304.4, 314.4, 411.1, 500

(56) References Cited

U.S. PATENT DOCUMENTS

| | | |
|---|---|---|
| 3,943,075 A | 3/1976 | Fishbein et al. |
| 4,105,722 A | 8/1978 | Sorenson |
| 4,245,055 A | 1/1981 | Smith ........................ 521/140 |
| 4,413,065 A | 11/1983 | Hall et al. .................... 521/82 |
| 5,926,911 A | 7/1999 | Chen ........................ 16/111 R |
| 5,987,705 A | 11/1999 | Reynolds .................... 16/431 |
| 5,992,270 A | 11/1999 | Hedelin et al. ................ 81/22 |
| 6,016,722 A | 1/2000 | Gierer et al. .................. 81/22 |

*Primary Examiner*—John M. Cooney, Jr.
(74) *Attorney, Agent, or Firm*—Gardner Carton & Douglas

(57) ABSTRACT

The present invention provides a vibration reducing grip material that includes a closed-cell poly(vinyl chloride) foam material having a Shore durometer of about 50 to about 70. According to one embodiment of the present invention, there is provided a vibration reducing handle cover for an impact tool.

12 Claims, 1 Drawing Sheet

GRIP MATERIAL

FIELD OF THE INVENTION

This invention relates to an improved vibration grip for impact tools such as nail hammers.

BACKGROUND OF THE INVENTION

The use of a hand-held impact tool is known to generate vibrations in the tool, the vibrations then being transferred to the user. Vibrations occurring during the use of hand-held devices, such as chipping hammers, jackhammers, riveters, jackleg drills, grinders, sanders, nail hammers, orbital sanders, chain saws, lawn mowers and edge trimmers, to name but a few, are well known to the legions of users of such devices.

Understandably, it is desirable to reduce the vibrations transferred to the hand during the use of hand-held tools such as impact tools.

This long-felt need has been the object of numerous attempts at vibration reduction in the prior art. For example, thick rubber gloves have been proposed as insulation means for reducing vibrations transferred to the hand. Similarly, thick rubber handles on impact tools have been proposed. However, the thickness required of the rubber component of these prior art devices makes them difficult to hold. Thus, the prior art devices introduce a new problem to the user. If the rubber glove or handle is made of a size to comfortably fit in the hand, then the effectiveness of the device to reduce vibrations may be compromised.

In those prior art devices using a thick rubber, or elastomeric, handle cover, the elastomer tends to harden over time. Thus, as the elastomer ages, the ability of the handle cover to reduce vibrations may diminish.

With respect to hammers, a change in the design of hammers from wood handles to steel or fiber glass handles has occurred. Wood hammer handles inherently offer a limited degree of vibration dampening. But because of the breakage over time of the wood handle, the trend has been towards hammers having steel or fiber glass handles.

Various attempts have been made to reduce vibrations produced by a hammer striking a surface. Hammers have been developed, for example, that have minimal rebound or recoil characteristics. Such hammers are sometimes referred to as "dead blow" hammers. In one very early prior art device, when the hammer is struck against a surface, the striking head is forced against a cushion that reportedly absorbs a portion of the shock of impact produced by the strike. Yet another early device included a slug, a charge of round shot, or a charge of powdered material in a chamber immediately behind a striking face of the hammer. This material in the chamber reportedly absorbed some of the forces produced by the hammer strike.

Other prior art devices have resorted to the use of elastic inserts and springs as shock absorbing members. During a strike of the hammer, vibrations are said to be dissipated through the shock-absorbing member. Other prior art devices employ a weight that is designed to move towards the striking portion of the hammerhead when it impacts a surface, thus impacting the striking portion to reduce hammer recoil. Such prior art devices introduce a new problem to the user in that the slidable weight itself tends to recoil, thus, causing undesirable vibration.

It would therefore be an advantage to have a material suitable for use as a handle cover for impact tools and related devices, such that the material reduces vibrations set up in the tool handle during use. It would also be an advantage to have a vibration reducing handle cover for an impact tool, the handle cover having a conventional thickness as compared to prior art handle covers. It would be an even further advantage to have a vibration dampening cover for hammer handles.

SUMMARY OF THE INVENTION

In accordance with the principals of the present invention, there is provided a material suitable for use as a handle cover for impact tools and related devices, such that the material reduces and quickly dampens vibrations set up in the tool handle during use.

The present invention also provides: a vibration dampening grip for an impact tool, the vibration dampening grip including: a grip material comprising a cured mixture of an organisol having a Shore A durometer of from about 63 to about 73 and a closed cell organisol foam, the closed cell organisol foam comprising a blowing agent, such that the blowing agent provides no more than about a 37 percent blow as measured in the organisol foam. The grip material is bonded to the impact tool.

Thus, it will be seen that according to principals of the present invention there is provided a vibration reducing grip material. According to one embodiment of the present invention, there is provided a vibration reducing handle cover for an impact tool. According to another embodiment of the present invention, there is provided a vibration reducing handle cover that does not significantly harden over time.

DETAILED DESCRIPTION OF THE INVENTION

According to one embodiment of the present invention, there is provided a grip material for an impact tool, the grip material comprising an organisol foam such that after curing the organisol foam has a Shore A durometer of from about 50 to about 70. In a preferred embodiment there is provided a grip material for an impact tool, the grip material comprising a mixture of an organisol and an organisol foam such that after curing the mixture the grip material has a Shore A durometer of about 50 to about 70.

The grip material of the present invention is applied as a liquid organisol foam, or a mixture of a liquid organisol and organisol foam, to a handle of an impact tool and is then heated or cured to provide a solid material. In one embodiment, a handle of an impact tool is placed in a mold and the liquid organisol foam, or the mixture of liquid organisol and organisol foam, is applied around the handle. The liquid organisol foam, or the mixture, is then heated until cured, thus forming the grip material of the present invention. In an alternative embodiment, the liquid organisol foam, or the mixture, may be applied to the handle prior to placing it in the mold. A coating may be applied to the handle prior to application of the organisol foam or the mixture, wherein the coating promotes the adhesion of the organisol foam, or the mixture, to the handle.

The mold may be of any conventional construction. The mold may be manufactured from tool steel for example. The mold may include heating elements inserted into the mold mass, such heating elements for providing heat to the organisol foam or the mixture. On the other hand, the mold may be heated in a molding press whereby heated platens on the molding press transfer heat to the mold, which, in turn, transfers heat to the organisol or the mixture. Yet a further example includes heating the mold in an oven. It is preferred that the mold be adapted to be held in a closed position during curing of the organisol or the mixture. It is also preferred that the mold be adapted to produce closed-cell foams.

Figure 1:
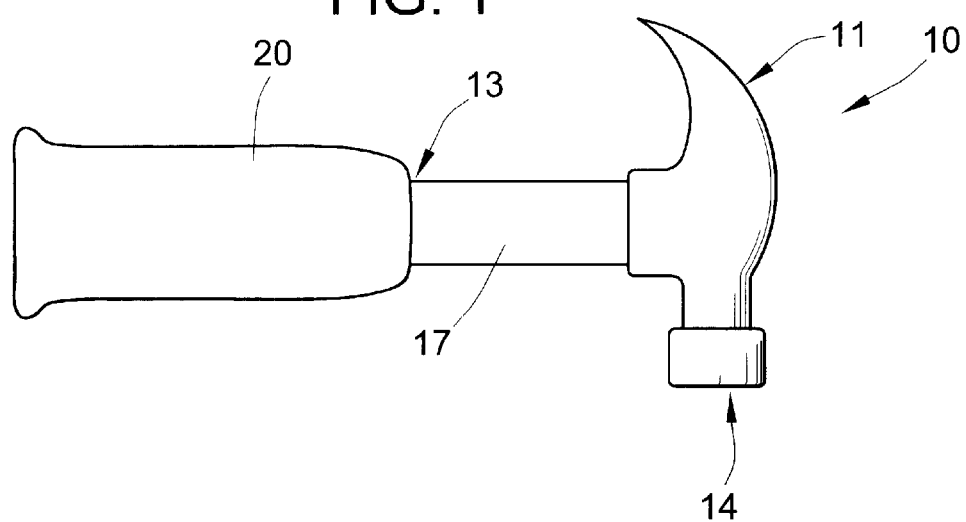
FIG. 1 is a side view of a claw hammer including the vibration-reducing grip of the present invention.
Figure 2:
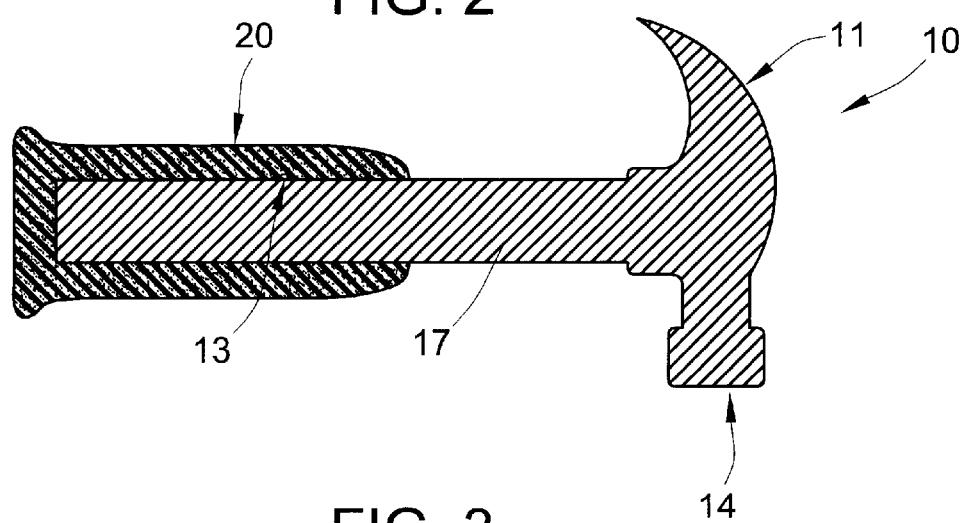
FIG. 2 is a cross-sectional view of the claw hammer of FIG. 1.

In FIG. 1, a claw hammer including the vibration-reducing grip of the present invention is labeled 10. The claw hammer 10 includes a hammerhead 11, a handle section 17, a striking surface 14, a grip 20 and a grip/handle interface 13. FIG. 2, a cross-sectional view of the claw hammer 10 of FIG. 1 is illustrated. In FIG. 2, the foam construction of the grip 20 can be seen. Also, the grip/handle interface 13 is further illustrated. The grip 20 is bonded to the handle section 17 at the grip/handle interface 13.

Organisols, as is known in the art, are typically liquid dispersions of a plastisol in an organic solvent or solvents. Plastisols, as is known in the art, are typically liquid dispersions of poly(vinyl chloride) in plasticizers. It is not unusual in the art to distinguish between a poly(vinyl chloride) latex and a plastisol where the former is a colloidal dispersion of poly(vinyl chloride) and the latter is a colloidal dispersion of poly(vinyl chloride) in a plasticizer. However, it is generally understood that a plastisol is a mixture of a poly(vinyl chloride) dispersion resin and a plasticizer. As used in the art, the term plastisol has also been used to describe plastisols diluted with an organic solvent. To reduce the likelihood of confusing terms as used in the art, hereinafter, the term organisol will be used to refer to both plastisols and organisols. It will be understood that the plasticizers are generally organic compounds, but may include organometallic compounds and polymeric plasticizers. The solvents used in organisols are typically inexpensive organic compounds. Both the plasticizer and the solvent must be compatible with the poly(vinyl chloride) so that the organisol may be made into a single-phase material for application to a handle of an impact tool.

Upon heating an organisol, loss of solvent, plasticizer, or both, allows fusion of the poly(vinyl chloride) particles to produce a solid material. The organisols of the present invention are thus curable in the sense that the liquid dispersions may form solid materials upon the application of heat and the loss of at least a portion of the liquid organic fraction. As used hereinafter, when an organisol is referred to as being cured or curable, it will be understood that this means fusion of the poly(vinyl chloride) fraction upon heating of the organisol, whereby loss of at least a fraction of the solvent, the plasticizer, or both, occurs. The durometer of a component is measured by means well known in the art on material that has been cured. Hereinafter, any reference to the durometer of an organisol, or mixtures of organisols, will be to the durometer of the cured organisol, or cured mixture.

In one embodiment, the organisols of the present invention are liquid dispersions of polymerized vinyl chloride. In yet another embodiment of the present invention, the organisols are liquid dispersions of poly(vinyl chloride). In still another embodiment of the present invention, the organisols are liquid dispersions of poly(vinyl chloride) in an organic solvent and an organic plasticizer. In a preferred embodiment, the organisols are the commercially available PLASTISOL. PLASTISOL may be obtained, for example, from Dennis Chemical, St. Louis, Mo.

PLASTISOL is commercially available as a liquid dispersion characterized by the durometer of the cured product. Thus, for example, a 40 Shore A durometer PLASTISOL refers to an organisol that produces a 40 Shore A durometer material upon curing. Curing, as defined above, involves heating the organisol so that at least a fraction of the plasticizer and/or solvent portion volatilizes and the poly(vinyl chloride) fraction fuses.

As but one example, the composition of the organisols of the present invention may the following components:

| Ingredient | % (based on total weight) |
| --- | --- |
| Poly(vinyl chloride) | 5–95 |
| Phthalate plasticizer | 95–2.5 |
| Epoxidized Soybean Oil | 95–2.5 |

The organisol of this example may further include minor amounts of vinyl chloride monomer, organometallic stabilizers and pigments. The organometallic stabilizers may include, for example, barium carboxylate or cadmium carboxylate. The pigments may include any of the compatible pigments known to the art. The amount of each component is selected so that the sum of these amounts equals 100 percent based on the total weight of the organisol prior to curing.

The phthalate plasticizer is a well-known class of general-purpose plasticizers. Phthalate plasticizers may include phthalate esters such as dialkyl phthalates. Phthalate plasticizers may include, for example, benzyl phthalates, glycol benzoates, and terephthalates. Other plasticizers may be used in the organisols of the present invention. For example, polymeric plasticizers may also be used.

Soybean oil is a linoleic acid oil, and, therefore, epoxidized linoleic acid oils other than soybean oil may be used in this embodiment. Generally, epoxidized and esterified fatty acids may be used in the present embodiment. For example, an epoxidized acrylate of soybean oil may be used with embodiments of the present invention.

Other solvents are known to be compatible with organisols where the amount of solvent used is limited. Such solvents include naphtha, for example, where the naphtha is present in an amount at or less than about 5 percent based on the total weight of the organisol prior to curing.

Other components may be used in additive amounts in the composition of the organisol of the present invention. For example, anti-oxidants, light stabilizers, and flame-retardants may be added to the organisol of the present invention without deleterious effect.

The organisol of the present invention may contain a sufficient amount of plasticizer such that upon curing the organisol exhibits elastic properties.

As another example, the composition of the organisols of the present invention may include the following components:

| Ingredient | % (based on total weight) |
|---|---|
| poly(vinyl chloride) | 5–95 |
| phthalate plasticizer | 95–5 |

As provided above, the organisol of this embodiment may further include minor amounts of vinyl chloride monomer, organometallic stabilizers and pigments. The organometallic stabilizers may include, for example, barium carboxylate or cadmium carboxylate. The pigments may include any of the compatible pigments known to the art. The amount of each component is selected so that the sum of these amounts equals 100 percent based on the total weight of the organisol prior to curing.

Organisol foams are known in the art. Typically, the organisol foams are similar in composition to the organisols described above, including a plasticizer and, optionally, an organic solvent, with the further addition of a chemical blowing agent. Upon heating the organisol foam, loss of solvent, plasticizer, or both, allows fusion of the particles, however, the heating will also activate the blowing agent resulting in air spaces, or cells, within the thus cured organisol foam. The organisol foams of the present invention are thus curable in the sense that the liquid dispersions may form a solid foam material upon the application of heat, the loss of at least a portion of the liquid organic fraction, and the activation of the blowing agent. The organisol foams may further include minor amounts of vinyl chloride monomer, organometallic stabilizers and pigments, as discussed above.

Blowing agents useful in the organisol foams include many of the well-known blowing agents for poly(vinyl chloride). For example, azodicarbonamide, sulfonyl hydrazide, semicarbizide and 2,2'-azobis(isobutyronitrile) may be used.

As used hereinafter, when an organisol foam is referred to as being cured or curable, it will be understood that this means fusion of the poly(vinyl chloride) fraction upon heating of the organisol foam, whereby loss of at least a fraction of the solvent, the plasticizer, or both, occurs. The durometer of a component is measured by means well known in the art on material that has been cured. Hereinafter, any reference to the durometer of an organisol foam, or mixtures of an organisol foam and organisols, will be to the durometer of the cured organisol foam, or cured mixture.

The organisol foams of the present invention are closed-cell foams. As such, the cells of the organisol foams of the present invention are predominantly discrete. The gas phase of a discrete cell is independent of the gas phase of other discrete cells, and, thus, the cells are closed. Techniques for producing closed-cell organisol foams are generally known in the art. It is conventional to describe such organisol foams by the estimated percentage of cellular volume contained by the sum of the cells. A term used in the art to describe this cellular volume is "blow." Thus, a 50 percent blow material is an organisol foam having 50 percent void space based on the total volume of the organisol foam. In this example, 50 percent of the cured organisol foam is solid material and 50 percent is gas phase material.

In one embodiment of the present invention, an organisol having about a 35 to about a 45 Shore A durometer and an organisol having about a 63 to about a 73 Shore A durometer are combined with a closed cell organisol foam having less than 50 percent blow. The mixture thus formed is useful in making the grip material of the present invention. Upon curing, the mixture forms a solid material having a Shore A durometer of about 50 to about 70.

In another embodiment of the present invention, an organisol having about a 63 to about a 73 Shore A durometer is combined with a closed cell organisol foam having less than 50 percent blow. The mixture thus formed is useful in making the grip material of the present invention. Upon curing, the mixture forms a solid material having a Shore A durometer of about 50 to about 70.

In yet another embodiment of the present invention, an organisol foam having a Shore A durometer of about 60 to about 70 and further having less than about 30 percent blow and more than about 5 percent blow is useful in making the grip material of the present invention. The durometer of the organisol foam, refers to the durometer of the cured organisol foam. Accordingly, upon curing the organisol foam forms a solid closed cell poly(vinyl chloride) foam material having a Shore A durometer of about 60 to about 70.

In another embodiment of the present invention, equal parts of a nominally 40 Shore A durometer organisol, a nominally 68 Shore A durometer organisol and an organisol foam having 37 percent blow are mixed. The mixture thus formed is useful in making the grip material of the present invention. Upon curing, the mixture forms a solid material having a Shore A durometer of about 60 to about 70.

In a preferred embodiment of the present invention, a nominally 68 Shore A durometer organisol and an organisol foam having 37 percent blow are mixed in proportions of about one-third part of the organisol and about two-third part of the organisol foam. The mixture thus formed is useful in making the grip material of the present invention. Upon curing, the mixture forms a solid material having a Shore A durometer of about 60 to about 70.

The advantages of this invention and its preferred embodiments will be demonstrated more fully by the following Examples, which demonstrate the practice of the invention. In these Examples, and elsewhere throughout the specification, parts and percentages are by weight, and temperatures are in degrees Fahrenheit, unless expressly indicated to be otherwise.

EXAMPLES 1–5

In these examples, a nominally 40 Shore A durometer organisol, a nominally 68 Shore A durometer organisol, a 37 percent blow organisol foam, and a 50 percent blow organisol foam were combined as provided in the table below. The nominally 40 Shore A durometer organisol is available under the product name GREEN PLASTISOL PX-9507-A from Dennis Chemical Company, St. Louis, Mo. The nominally 68 Shore A durometer organisol is available commercially under the product name BLUE PLASTISOL PX-7537-A, also from Dennis Chemical Company, St. Louis, Mo. The 37 percent blow organisol foam is available under the product name RED FOAM PLASTISOL PX-9508-C, from Dennis Chemical Company, St. Louis, Mo. The 50 percent blow organisol foam is also available from Dennis Chemical Company, St. Louis, Mo., under the product name WHITE FOAM PLASTISOL PX-9508D.

TABLE 1

| Example No. | PLASTISOL 40 Shore A (wt-%) | PLASTISOL 68 Shore A (wt-%) | PLASTISOL 37% Blow (wt-%) | PLASTISOL 50% Blow (wt-%) | Oven Temp. (° F.) |
|---|---|---|---|---|---|
| 1 | 33⅓ | 33⅓ | 33⅓ |  | 370 |
| 2 |  | 50 |  | 50 | 370 |
| 3 | 33⅓ | 33⅓ |  | 33⅓ | 370 |
| 4 | 33⅓ | 33⅓ | 33⅓ |  | 355 |
| 5 |  | 33⅓ | 66⅔ |  | 355 |

In Table 1, where the weight percent of a component is provided as $33^{1/3}$, it is understood that each of the three components added were combined in about equal amounts. Where the weight percent of a component is provided as $66^{2/3}$, it is understood that this represents about two-thirds of the overall composition.

The mixture thus formed was then used to coat the handle of an all steel claw hammer. The handle had previously been painted with a primer to promote adhesion of the mixture to the handle. Although beneficial, the use of the primer is not critical to the utility of the present invention. The coated handle was placed into a mold that encased the handle section of the hammer. The mold containing the hammer was then placed into an oven and heated for about 35 to about 40 minutes. It was determined that a temperature, as measured in the curing grip material of the present invention, ranging from about 275° F. to about 425° F. provided adequate cure of the grip material within the heating time provided.

For the compositions of Table 1 above, each composition upon curing showed acceptable bonding to the hammer handle. For the composition of Example 5, the durometer of the cured material was about 65 Shore A. A hammer having a grip of the composition of Example 5 was subjected to further testing as described below.

Comparative Example 2

An organisol was prepared such that upon curing it yielded a material having a durometer of about 60 Shore A. This composition contained no organisol foam. The organisol thus formed was then used to coat the handle of an all steel claw hammer. The handle had previously been painted with a primer to promote adhesion of the mixture to the handle. The coated handle was placed into a mold that encased the handle section of the hammer. The mold containing the hammer was then placed into an oven and heated for about 35 minutes to about 40 minutes and the organisol was thus cured. A hammer having a grip of the composition of Comparative Example 2 was subjected to further testing as described below.

Comparative Example 3

An organisol was prepared such that upon curing it yielded a material having a durometer of about 68 Shore A. This composition contained no organisol foam. The organisol thus formed was then used to coat the handle of an all steel claw hammer. The handle had previously been painted with a primer to promote adhesion of the mixture to the handle. The coated handle was placed into a mold that encased the handle section of the hammer. The mold containing the hammer was then placed into an oven and heated for about 35 minutes to about 40 minutes and the organisol was thus cured. A hammer having a grip of the composition of Comparative Example 3 was subjected to further testing as described below. The material of this example is representative of prior art grip material.

Shock/Vibration Testing of Grip Material

The hammers as prepared in Example 4 and Comparative Examples 2 and 3, were subjected to shock and vibration testing. Each hammer tested was clamped into a polyurethane fixture. A sensor was wrapped around the hammer grip. The sensor consists of a length of 24 gage piezo-electric wire, adhered to a piece of vibration dampening material. The vibration dampening material served to isolate the grip from the fixture. The fixture was clamped onto a swing arm. During testing, the swing arm and fixture are raised to a pre-determined stop and then released. The face or head of the hammer being tested then strikes a steel anvil. The piezo-electric wire deforms due to the vibrations caused by the impact and generates an electric current proportional to the deformations and, correspondingly, the vibrations. The resulting current is recorded and provides a comparison of the vibration dampening capability of the various grip materials. A plot of current output as a function of time produces a vibration curve. From each vibration curve a shock factor is determined. The greater the vibration of a hammer during the test the greater the shock factor generated for that hammer. The following Table 2 compares the shock factors for the hammers tested. The values provided under the column labeled "Shock Factor," in Table 2 below, are the results of discrete shock/vibration tests on the hammers indicated. The values provided under the column labeled "Average Shock Factor," in Table 2 below, are the arithmetic averages of the corresponding discrete values for the hammers indicated.

TABLE 2

| Hammer Tested | Shock Factor | Average Shock Factor |
|---|---|---|
| Example 5 | 299, 301, 292, 291 | 295.75 |
| Comparative Example 2 | 494, 496, 490, 498 | 494.50 |
| Comparative Example 3 | 705, 700, 703, 698 | 701.50 |

Thus it can be seen that a hammer grip comprising the material of Example 5 provides an unexpected reduction in the vibration of the hammer during the Shock/Vibration Test. The material of Example 5 provided a 67 percent reduction in Average Shock Factor as compared to the material of Comparative Example 2. The material of Example 5 provided a 137 percent reduction in an Average Shock Factor as compared to the material of Comparative Example 3, the prior art material.

A comparison of Example 5 and Comparative Example 2 demonstrates that the mechanism of vibration dampening is not merely a function of durometer. The hammer grip of Example 5 is about a 65 Shore A durometer material, while the hammers grip of Comparative Example 2 is about a 60 Shore A durometer material. Regardless, the grip material of the present invention reduces vibrations by 67 percent over the 60 Shore A durometer grip material of Comparative Example 2.

Grip materials of the compositions of Example 5 and Comparative Example 3 were each allowed to age while exposed to normal ambient laboratory conditions. Such conditions are approximately 68° F. and approximately 60% relative humidity. Surprisingly, the durometer of the grip material of Example 5 showed very little change after two months aging. However, the grip material of Comparative Example 3 changed from nominally 68 Shore A durometer to nominally 80 Shore A durometer in the same two-month period.

Accelerometer Testing

Figure 3:
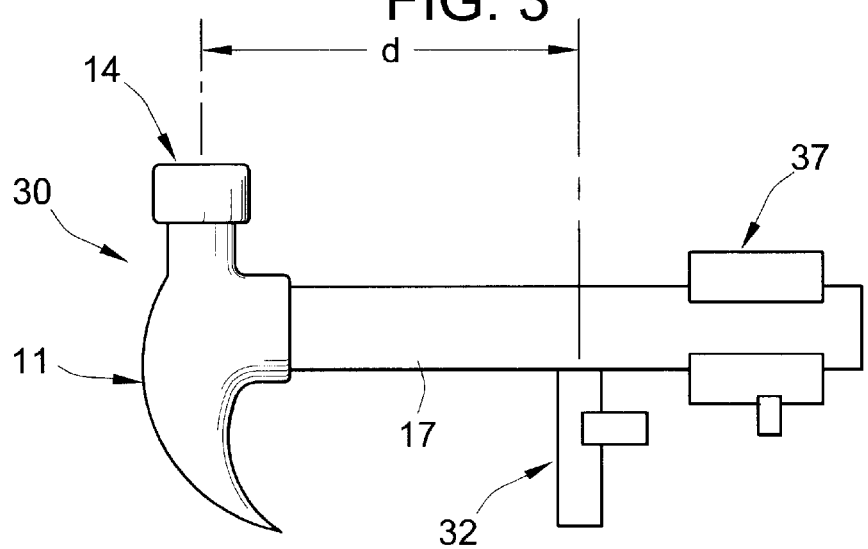
FIG. 3 is a schematic of an accelerometer test configuration used in testing a claw hammer including the vibration-reducing grip of the present invention.

The hammers as prepared in Example 5 and Comparative Example 3 were subjected to accelerometer testing. The testing of these hammers was accomplished by securing a hammer in a consistent manner, mounting an accelerometer on one end of the hammer to measure vibration amplitude and duration, and subjecting the hammer to an impact force at a predetermined and measured distance from the accelerometer location. The impact force was applied with an impact tester to assure that each hammer tested received the same amount of applied energy. Referring now to FIG. 3, a vice 37 secured a hammer 30 by clamping the hammer 30 at the grip (not shown) bonded to the handle section 17. The hammer 30 further includes a handle section 17, a hammerhead 11 and a striking surface 14. The impact force was applied at the striking surface 14. The vise 37 was tightened to clamp the grip to a torque value as measured by a calibrated torque wrench traceable to the National Institute of Standards and Testing. An accelerometer 32 was attached to the handle section 17 at a distance d from the striking surface 14. The distance d between the striking surface 14 and the accelerometer 32 was measured by a calibrated caliper. The distance d for these tests was fixed at 6 inches.

The results of the accelerometer testing are summarized in Table 3 below. As shown, the hammer of Example 5 significantly reduced the time to dampen a vibration and allowed a lower peak frequency than the hammer of Comparative Example 3. The time required to dampen a vibration for the hammer of Example 5, surprisingly, was 50 percent less than the corresponding time for the hammer of Comparative Example 3. The peak frequency allowed by the hammer of Example 5 was 7 percent less than the corresponding peak frequency for the hammer of Comparative Example 3. As demonstrated, the grip material of the present invention significantly reduces the time to dampen a vibration as compared to the grip material of the prior art.

TABLE 3

| Hammer Tested | Time to Dampen Vibration (seconds) | Peak Frequency (Hz) |
| --- | --- | --- |
| Example 5 | 0.15 | 70 |
| Comparative Example 3 | 0.30 | 75 |

The grip material of the present invention, when used as a handle cover for an impact tool, significantly and unexpectedly reduces the effects of vibrations generated in the impact tool during use. A claw hammer including the vibration-reducing grip of the present invention provides a reduced shock factor, a reduced time to dampen a vibration, and a reduced peak frequency of a vibration, as compared to a prior art device.

There has been provided in accordance with the present invention, a material suitable for use as a handle cover for impact tools and related devices, such that the material reduces vibrations set up in the tool handle during use. While the invention has been described with specific embodiments, many alternatives, modifications and variations will be apparent to those skilled in the art in light of the forgoing description. Accordingly, it is intended to include all such alternatives, modifications and variations set forth within the spirit and scope of the appended claims.

What is claimed is:

1. An impact tool having a vibration dampening grip, the impact tool comprising:
   a handle;
   a grip material affixed to the handle;
   the grip material including a cured mixture; the mixture before curing comprising:
      an organisol having a Shore A durometer of from about 63 to about 73
      upon curing the organisol, the organisol comprising polyvinyl chloride); and
   a closed cell organisol foam, the closed cell organisol foam comprising poly(vinyl chloride) and a blowing agent, such that the blowing agent provides no more than about a 50 percent blow as measured in the organisol foam;
   wherein the grip material is bonded to the impact tool and wherein the grip material has a Shore A durometer of about 50 to about 70.

2. The impact tool of claim 1 wherein the grip material has a Shore A durometer of about 65.

3. The impact tool of claim 1 wherein the organisol has a Shore A durometer of about 68.

4. The impact tool of claim 1 wherein the organisol foam is selected such that the blowing agent provides about a 37 percent blow as measured in the organisol foam.

5. An impact tool having a vibration dampening grip, the impact tool comprising:
   a handle having a grip material affixed thereto;
   the grip material including a closed cell poly(vinyl chloride) foam having a Shore A durometer of from about 50 to about 70 and a cell volume of from about 5 percent to about 30 percent based on the total volume of the grip material;
   wherein the closed cell poly(vinyl chloride) foam is bonded to the impact tool.

6. The impact tool of claim 5 wherein the closed cell poly(vinyl chloride) foam has a Shore A durometer of about 65.

7. An impact tool having a vibration dampening grip the impact tool produced by the steps of:
   positioning a handle of the impact tool in a mold;
   applying a curable organisol foam to the handle of the impact tool in the mold, the curable organisol foam having a Shore A durometer of from about 50 to about 70 upon curing, the organisol foam comprising poly (vinyl chloride) and a blowing agent, such that the blowing agent provides no more than about a 30 percent blow upon curing of the organisol foam;
   heating the organisol foam to a temperature measured within the organisol foam of from about 275° F. to about 425° F.;
   maintaining the temperature within the organisol foam for a period of time sufficient to cure the organisol foam and form the vibration dampening grip; and
   removing the handle of the impact tool from the mold.

8. The impact tool of claim 7 wherein the vibration dampening grip has a Shore A durometer of about 65.

9. The impact tool of claim 7 wherein the curable organisol foam includes a mixture comprising:
   an organisol having a Shore A durometer of from about 63 to about 73, the organisol comprising poly(vinyl chloride); and a closed cell organisol foam, the closed cell organisol foam comprising poly(vinyl chloride) and a blowing agent, such that the blowing agent provides no more than about a 50 percent blow as measured in the organisol foam.

10. The impact tool of claim 9 wherein the vibration dampening grip has a Shore A durometer of about 65.

11. The impact tool of claim 7 wherein the curable organisol foam includes a mixture comprising:

a first organisol having a Shore A durometer of from about 63 to about 73, the first organisol comprising poly(vinyl chloride);

a second organisol having a Shore A durometer of from about 35 to about 45, the second organisol comprising poly(vinyl chloride); and a closed cell organisol foam, the closed cell organisol foam comprising poly(vinyl chloride); and a blowing agent, such that the blowing agent provides no more than about a 50 percent blow as measured in the organisol foam.

12. The impact tool of claim 10 wherein the vibration dampening grip has a Shore A durometer of about 65.

\* \* \* \* \*